(12) United States Patent
Wagner et al.

(10) Patent No.: US 6,649,674 B2
(45) Date of Patent: Nov. 18, 2003

(54) FLAME-PROOF POLYESTER MOLDING COMPOSITIONS COMPRISING HYDROTALCITE, RED PHOSPHORUS AND MELAMINE CYANURATE

(75) Inventors: Michael Wagner, Moers (DE); Henricus Peerlings, Solingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/178,451

(22) Filed: Jun. 24, 2002

(65) Prior Publication Data

US 2003/0018108 A1 Jan. 23, 2003

(30) Foreign Application Priority Data

Jun. 27, 2001 (DE) .......................................... 101 30 831

(51) Int. Cl.[7] ........................ C08K 5/3492; C08K 3/38; C08K 3/32; C08K 3/18
(52) U.S. Cl. ........................ 524/100; 524/101; 524/405; 524/414; 524/418; 524/424; 524/432
(58) Field of Search .................................. 524/100, 101, 524/405, 414, 418, 424, 432

(56) References Cited

FOREIGN PATENT DOCUMENTS

| JP | 6-157880 | 6/1994 |
| JP | 11-140290 | 5/1999 |
| JP | 11-335531 | 12/1999 |
| WO | 99/27016 | 6/1999 |

OTHER PUBLICATIONS

Database WPI Section Ch, Week 200008 Derwent Publications Ltd., London, GB; AN 2000–092704 XP002211873 & JP 11 335531 A (Toray Ind Inc), Dec. 7, 1999 in der Anmeldung erwahnt Zusammenfassung.

*Primary Examiner*—Kriellion A. Sanders
(74) *Attorney, Agent, or Firm*—Joseph C. Gil; Aron Preis

(57) ABSTRACT

A flame-proof polyester molding compositions is disclosed. The composition that exhibits good flame-resistance, particularly in thin-walled moldings, contains red phosphorus, nitrogen-containing compounds and a small amount of a hydrotalcite. The composition is particularly suitable for the preparation of moldings, sheeting and fibers.

15 Claims, No Drawings

FLAME-PROOF POLYESTER MOLDING COMPOSITIONS COMPRISING HYDROTALCITE, RED PHOSPHORUS AND MELAMINE CYANURATE

FIELD OF THE INVENTION

The invention relates to flame-proof polyester molding compositions and more particularly to thin-walled moldings made therefrom.

SUMMARY OF THE INVENTION

A flame-proofed polyester molding composition is disclosed. The composition that exhibits good flame-resistance, particularly in thin-walled moldings, contains red phosphorus, nitrogen-containing compounds and a small amount of a hydrotalcite. The composition is particularly suitable for the preparation of moldings, sheeting and fibers.

BACKGROUND OF THE INVENTION

Polyester molding compositions which are rendered flame-proof are of considerable importance in the electrical/electronics field and are used for the production of supports for voltage-carrying parts, for example. Apart from good flame-resistance, these compositions also have to have good mechanical and electrical properties. In addition, halogen-free molding compositions, particularly ones that are free of halogenated flame retarding agents, are increasingly being required.

There has been a series of developments in this field.

Thus JP-A 06-157880 describes molding compositions comprising polyethylene terephthalate which are made flame-resistant by melamine cyanurate and organophosphates and which exhibit good corrosion behavior in addition to good smoke fume properties.

Flame-proof polyester molding compositions are known from JP-A 11-140290 which contain fluorine compounds in addition to organophosphates and melamine cyanurate.

WO 98/30632 discloses flame-resistant thermoplastic polyesters which contain coated red phosphorus and a phenolic novolac resin.

WO 99/27016 describes red phosphorus in combination with an additional phosphorus compound and a fluoropolymer for the flame-proofing of mixtures of polybutylene terephthalate and polycarbonate.

JP-A 11-335531 relates to molding compositions comprising polybutylene and polyethylene terephthalate which in addition to coated red phosphorus contain triazine compounds and cyanuric acid compounds and a polyolefine, and which are suitable for use in the electrical/electronics field.

Nevertheless, no satisfactory degree of success has hitherto been achieved in formulating polybutylene terephthalate in particular, without the admixture of less flammable polymers such as polycarbonate, with halogen-free flame-retardants such that good flame-resistance is achieved, especially for thin-walled applications/-moldings.

DETAILED DESCRIPTION OF THE INVENTION

Surprisingly, it has now been found that the flame-resistance of polyester molding compositions, particularly polybutylene terephthalate, which comprise red phosphorus and melamine cyanurate, may be considerably improved by the addition of small amounts of a hydrotalcite, particularly in thin-walled components and moldings. Moreover, the molding compositions according to the invention exhibit an outstanding resistance in the glowing wire test.

The present invention thus relates to molding compositions containing:

A) one or more polyester, polyester carbonate or polycarbonate

B) 5 to 30 parts by weight, preferably 10 to 20 parts by weight, most preferably 14 to 20 parts by weight, of a flame retardant containing
  b1) 16 to 50% by weight, preferably 28.5 to 50% by weight, most preferably 33 to 50% by weight (with respect to B) of red phosphorus, and
  b2) 50 to 84% by weight, preferably 50 to 71.5% by weight, most preferably 50 to 67% by weight (with respect to B) of a nitrogen compound, C) 0.001 to 0.69 parts by weigh, preferably 0.05 to 0.50 parts by weight, of a hydrotalcite, as well as D) 1 to 50 parts by weight, preferably 10 to 40 parts by weight, most preferably 10 to 35 parts by weight, of fillers and/or reinforcing agents, E) 0 to 50 parts by weight, preferably 0.001 to 40 parts by weight, most preferably 0.001 to 25 parts by weight, of other conventional functional additives, wherein the sum of the proportions of A to E is 100 parts by weight.

Polyesters as defined by component A) firstly comprise polyalkylene terephthalates, i.e. reaction products of dicarboxylic acids, preferably aromatic dicarboxylic acids, or reactive derivatives thereof (e.g. dimethyl esters or anhydrides) and aliphatic, cycloaliphatic or araliphatic diols, and mixtures of said reaction products, and secondly comprise completely aromatic polyesters which are described in detail below.

Polyalkylene terephthalates may be produced by known methods from terephthalic acid (or reactive derivatives thereof) and aliphatic or cycloaliphatic diols containing 2 to 10 C atoms (Kunststoff-Handbuch, Volume VIII, pages 695 et seq., Karl-Hanser-Verlag, Munich 1973).

The preferred polyalkylene terephthalates contain at least 80, preferably 90 mol % with respect to the dicarboxylic acid, of terephthalic acid radicals, and at least 80, preferably at least 90 mol % with respect to the diol component, of ethylene glycol and/or 1,3-propanediol and/or butanediol radicals.

In addition to terephthalic acid radicals, the preferred polyalkylene terephthalates may contain up to 20 mol % of radicals of other aromatic dicarboxylic acids containing 8 to 14 C atoms, or of aliphatic dicarboxylic acids containing 4 to 12 C atoms, such as radicals of phthalic acid, isophthalic acid, naphthalene-2,6-dicar-boxylic acid, succinic acid, adipic acid, sebacic acid, azelaic acid or cyclohexane-diacetic acid.

Apart from ethylene or 1,3-propanediol or 1,4-butanediol radicals, the preferred polyalkylene terephthalates may contain up to 20 mol % of other aliphatic diols comprising 3 to 12 C atoms or cycloaliphatic diols comprising 6 to 21 C atoms, e.g. radicals of 1,3-propanediol, 2-ethylpropanediol-1,3, neopentyl glycol, 1,5-pentanediol, 1,6-hexanediol, cyclohexane-dimethanol-1,4, 3-methylpentanediol-2,4, 2-methylpentanediol-2,4, 2,2,4-trimethylpentanediol-1,3 and 1,6,2-ethylhexanediol-1,3, 2,2-diethylpropanediol-1,3, 2,5-hexanediol, 1,4-di-(β-hydroxyethoxy)-benzene, 2,2-bis-(4-hydroxycyelohexyl)-propane, 2,4-dihydroxy-1,1,3,3-tetramethyl-cyclobutane, 2,2-bis-(3-β-hydroxyethoxy-phenyl)propane and 2,2-bis-(4-hydroxypropoxy-phenyl)-propane (DE-A 24 07 674, 24 07 776, 27 15 932).

The polyalkylene terephthalates may be branched by the incorporation of relatively small amounts of trihydric or tetrahydric alcohols or of tri- or tetrabasic carboxylic acids, such as those described in DE-A 19 00 270 and U.S. Pat. No. 3,692,744, incorporated herein by reference for example. Examples of preferred branching agents include trimesic acid, trimellitic acid, trimethylol-ethane and -propane, and pentaerythritol.

It is advisable to use not more than 1 mol % of the branching agent with respect to the acid component.

Particularly preferred polyalkylene terephthalates are those which are produced solely from terephthalic acid and reactive derivatives thereof, (e.g. dialkyl esters thereof) and ethylene glycol and/or 1,3-propanediol and/or 1,4-butanediol (polyethylene-, polypropylene- and polybutylene terephthalates), as well as mixtures of these polyalkylene terephthalates. Within the scope of the present invention, the use of mixtures of polybutylene- and polyethylene terephthalates is quite particularly preferred.

The preferred polyalkylene terephthalates also include copolyesters which are produced from at least two of the aforementioned acid components and/or from at least two of the aforementioned alcohol components; the most preferred copolyesters are poly(ethylene glycol/1,4-butanediol) terephthalates.

The polyalkylene terephthalates generally have an intrinsic viscosity of about 0.4 to 1.5, preferably 0.5 to 1.3, as measured in phenol/o-dichlorobenzene (1:1 parts by weight) at 25° C.

The completely aromatic polyesters which are also suitable are the reaction products of aromatic dicarboxylic acids or reactive derivatives thereof with corresponding aromatic dihydroxy compounds.

The compounds discussed above in the description of the polyalkylene terephthalates may be used as aromatic dicarboxylic acids. Mixtures of 5 to 100 mol % isophthalic acid and 0 to 95 mol % terephthalic acid, particularly mixtures ranging from about 80% terephthalic acid to 20% isophthalic acid to approximately equivalent mixtures of these two acids, are preferred.

The dihydroxy compounds which can also be used may be described by formula (I) below:

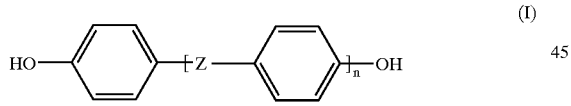

(I)

which is characterised in that Z represents an alkylene or cycloalkylene group containing up to 8 carbon atoms, an arylene group containing up to 12 carbon atoms, a carbonyl group, an oxygen or a sulphur atom, a sulphonyl group or a chemical bond, and m has a value from 0 to 2. These compounds may each comprise $C_1$–$C_6$ alkyl or alkoxy groups as well as fluorine, chlorine or bromine as substituents on their phenylene units.

Representatives of these substances include dihydroxyphenyl, di-(hydroxyphenyl)-alkanes, di-(hydroxypheny)cycloalkanes, di-(hydroxyphenyl) sulphide, di-(hydroxy-phenyl) ether, di-(hydroxyphenyl) ketone, di-(hydroxyphenyl) sulphoxide, di-(hydroxyphenyl), α,α-di (hydroxyphenyl)dialkylbenzenes, di-(hydroxy-phenyl)-sulphone, di-(hydroxybenzoyl)benzene, resorcinol and hydroquinone, as well as derivatives thereof which comprise alkylated or halogenated nuclei.

Of the aforementioned group, 4,4'-dihydroxydiphenyl, 2,4-di-(4'-hydroxyphenyl)-2-methylbutane, α,α'-di-(4-hydroxyphenyl)-p-diisopropylbenzene, 2,2-di-(3'-methyl-4'-hydroxyphenyl)propane and 2,2-di-(3'-chloro-4'-hydroxyphenyl)propane are preferred.

Moreover, 2,2-di-(3',5'-dimethyl-4'-hydroxyphenyl) propane, 2,2-di-(4'-hydroxy-phenyl-propane, 4,4'-dihydroxydiphenylsulphone, 2,2-di(3,5-di-chloro-dihydroxy-phenyl)propane, 1,1-di-(4'-hydroxyphenyl) cyclohexane and 3,4'-dihydroxybenzo-phenone are particularly preferred.

Mixtures of the aforementioned diol compounds may also be used.

Moreover, apart from pure polyalkylene terephthalates and pure, completely aromatic polyesters, any mixtures of these polyesters may be used, as may the polyesters cited below.

The term "polyesters" is also to be understood to mean polycarbonates and polyester carbonates.

Polycarbonates and polyester carbonates are known from the literature or may be produced by methods known from the literature (for the production of poly-carbonates, for example, see Schnell, "Chemistry and Physics of Polycarbonates", Interscience Publishers, 1964, as well as DE-A 1 495 626, DE-A 2 232 877, DE-A 2 703 376, DE-A 2 714 544, DE-A 3 000 610 and DE-A 3 832 396; for the production of polyester carbonates, see DE-A 3 077 934, for example).

Aromatic polycarbonates may be produced, for example, by the reaction of diphenols with carbonic acid halides, preferably phosgene, and/or with aromatic dicarboxylic acid dihalides, preferably benzene-dicarboxylic acid dihalides, by the phase boundary method, optionally with the use of chain terminators, for example monophenols, and optionally with the use of trifunctional branching agents or branching agents with a functionality greater than three, e.g. triphenols or tetraphenols.

Diphenols for the production of aromatic polycarbonates and/or aromatic polyester carbonates are preferably those of formula (II)

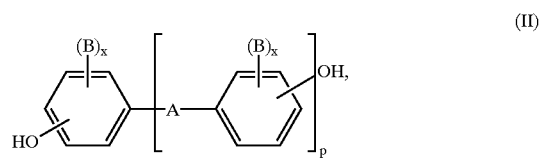

(II)

wherein

A denotes a single bond, a $C_1$–$C_5$ alkylene, a $C_2$–$C_5$ alkylidene, a $C_5$–$C_6$ cyclo-alkylidene, —O—, —SO—, —CO—, —S— or a $C_6$–$C_{12}$ arylene, on to which further aromatic rings, which optionally contain hetero atoms, may be condensed, or denotes a radical of formulae (III) or (IV)

(III)

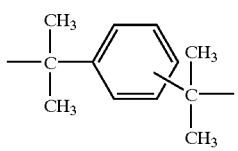
(IV)

B in each case denotes a $C_1$–$C_{12}$ alkyl, preferably methyl, or a halogen, preferably chlorine and/or bromine, x denotes 0, 1 or 2, which are each independent of each other, p denotes 1 or 0, and $R^1$ and $R^2$ independently of each other and for each $X^1$, denote hydrogen or a $C_1$–$C_6$ alkyl, preferably hydrogen, methyl or ethyl, $X^1$ denotes carbon, and m is an integer from 4 to 7, preferably 4 or 5, with the proviso that on at least one $X^1$ atom $R^1$ and $R^2$ simultaneously denote an alkyl.

The preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl)-ethers, bis-(hydroxyphenyl)-sulphoxides, bis-(hydroxyphenyl)-ketones, bis-(hydroxyphenyl)-sulphones and α,α'-bis-(hydroxyphenyl)-diisopropyl-benzenes, as well as derivatives thereof which comprise brominated and/or chlorinated nuclei.

Particularly preferred diphenols include 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulphide, 4,4'-dihydroxydiphenyl sulphone, as well as di- and tetrabrominated or chlorinated derivatives thereof, such as 2,2-bis-(3-chloro-4-hydroxyphenyl)-propane, 2,2-bis-(3,5-dichloro-hydroxyphenyl)-propane or 2,2-bis-(3,5-dibromo-4-hydroxyphenyl)-propane.

2,2-bis-(4-hydroxyphenyl)-propane (bisphenol A) is particularly preferred.

The diphenols may be used individually or in admixture.

Diphenols are known from the literature or may be obtained by methods known from the literature.

Examples of chain terminators which are suitable for the production of thermoplastic, aromatic polycarbonates include phenol, p-chlorophenol, p-tert-butylphenol and 2,4,6-tribromophenol, and also include long chain alkylphenols such as 4-(1,3-tetramethyl-butyl)-phenol according to DE-A 2 842 005 and monoalkylphenols or. dialkylphenols which contain a total of 8 to 20 C atoms in their alkyl substituents, such as 3,5-di-tert.-butyl-phenol, p-iso-octylphenol, p-tert.-octylphenol, p-dodecyl-phenol, 2-(3,5-dimethylheptyl)-phenol and 4-(3,5-dimethylheptyl)-phenol. The amount of chain terminators used is between 0.5 mol % and 10 mol % with respect to the molar sum of diphenols.

The thermoplastic, aromatic polycarbonates have mean, weight average molecular weights (as measured by ultracentrifuging or by the measurement of scattered light, for example) ranging from 10,000 to 200,000, preferably 20,000 to 80,000.

The thermoplastic aromatic polycarbonates may be branched in the known manner, preferably by the incorporation of 0.05 to 2.0 mol %, with respect to the sum of the diphenols used, of trifunctional compounds or of compounds with a functionality greater than three, for example those which contain three or more than three phenolic groups.

Both homopolycarbonates and copolycarbonates are suitable. In order to produce some suitable copolycarbonates according to the invention, 1 to 25% by weight, preferably 2.5 to 25% by weight, (with respect to the total amount of diphenols used) of polydiorganosiloxanes which comprise terminal hydroxy-aryloxy groups may also be used. These are known (see U.S. Pat. No. 3,419,634, for example) or may be prepared by methods known from the literature. The production of copolycarbonates which contain polydiorganosiloxanes is described in DE-A 3 334 782, for example.

Apart from bisphenol A, the preferred polycarbonates also include copolycarbonates of bisphenol A which comprise up to 15 mol %, with respect to the molar sum of diphenols, of diphenols other than those cited as being preferred or particularly preferred, especially 2,2-bis(3,5-dibromo-4-hydroxyphenyl)-propane.

Examples of aromatic acid halides for the production of aromatic polyester carbonates include the diacid chlorides of isophthalic acid, terephthalic acid, diphenyl ether-4,4'-dicarboxylic acids and naphthalene-2,6-dicarboxylic acids.

Mixtures of the diacid dichlorides of isophthalic acid and terephthalic acid in a ratio between 1:20 and 20:1 are particularly preferred.

During the production of polyester carbonates, a carbonic acid halide, preferably phosgene, may be used in addition as a derivative of a bifunctional acid.

Apart from the aforementioned monophenols, suitable chain terminators for the production of aromatic polyester carbonates also include chlorocarbonic acid esters thereof, and acid chlorides of aromatic monocarboxylic acids which may optionally be substituted by $C_1$–$C_{22}$ alkyl groups, as well as aliphatic $C_2$–$C_{22}$ monocarboxylic acid chlorides.

The amount of chain terminators ranges from 0.1 to 10 mol % in each case, with respect to the moles of diphenols in the case of phenolic chain terminators, and with respect to the moles of dicarboxylic acid chlorides in the case of monocarboxylic acid chloride chain terminators.

The aromatic polyester carbonates may also contain hydroxycarboxylic acids as synthesis components.

The aromatic polyester carbonates may either be linear or branched in the known manner (in this respect, see DE-A 2 940 024 and DE-A 3 007 934 also).

Examples of branching agents which may be used include tri- or multifunctional carboxylic acid chlorides such as trimesic acid trichloride, cyanuric acid trichloride, 3,3',4,4'-benzophenone-tetracarboxylic acid tetrachloride, 1,4,5,8-napthalene-tetra-carboxylic acid tetrachloride or pyromellitic acid tetrachloride, in amounts from 0.01 to 1.0 mol % (with respect to the dicarboxylic acid dichlorides used), and tri- or multifunctional phenols such as phloroglucinol, 4,6-dimethyl-2,4,6-tri-(4-hydroxy-phenyl)-heptene-2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(hydroxy-phenyl)-phenylmethane, 2,2-bis[4,4-bis(4-hydroxy-phenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-hydroxy-phenyl)-propane, tetra-(4-[4-hydroxy-phenyl-isopropyl]-phenoxy)-methane or 1,4-bis[4,4-hydroxytriphenyl)-methyl]-benzene, in amounts of 0.01 to 1.0 mol % with respect to the diphenols used. Phenolic branching agents may be used with diphenols; acid chloride branching agents may be added together with acid dichlorides.

In the thermoplastic aromatic polyester carbonates, the proportion of carbonate structural units may be arbitrarily varied. The proportion of carbonate structural units is preferably up to 100 mol %, particularly up to 80 mol %, most preferably up to 50 mol %, with respect to the sum of ester groups and carbonate groups. Both the ester- and the carbonate content of aromatic polyester carbonates may be present in the form of blocks or may be randomly distributed in the condensation polymer.

The relative solution viscosity ($\eta_{rel}$) of the aromatic polycarbonates and polyester carbonates falls within the range from 1.18 to 1.4, preferably 1.22 to 1.3 (as measured on solutions of 0.5 g polycarbonate or polyester carbonate in 100 ml methylene chloride solution at 25° C.).

The thermoplastic aromatic polycarbonates and polyester carbonates may be used alone or in any mixture with each other.

Moreover, all known polyester block copolymers may be used, such as those described in U.S. Pat. No. 3,651,014.

In order to impart flame-resistance, component B) is a mixture of red phosphorus b1) and a nitrogen compound b2) in an amount of 5 to 30 parts by weights, preferably 10 to 20 parts by weight with respect to the total molding composition. It has been found, particularly for polybutylene terephthalate, that particularly good results may be obtained by using 14 to 20 parts by weight of a mixture of red phosphorus b1) and nitrogen compound b2).

Red phosphorus as defined by component b1) is to be understood to mean all colored allotropic forms of phosphorus in finely divided form. The average particle size of the particles thereof usually ranges between 0.1 and 100 $\mu$m, preferably between 0.2 and 50 $\mu$m. The particle size of the phosphorus may be adjusted by grinding, particularly by wet-grinding in ball mills or bead mills. Suitable grinding media include water and organic solvents such as toluene, mineral oil, dimethylformamide, di-methylacetamide and formic acid.

In addition to untreated red phosphorus, red phosphorus which is treated or encapsulated in a known manner may also preferably be used. Suitable materials for coating red phosphorus include inorganic materials such as metal hydroxides or silicates, organic compounds, preferably polymers such as phenol-formaldehyde resins, urea-melamine-phenol-formaldehyde resins, urea-resorcinol-formaldehyde-hexamethylenetetramine resins, epoxy resins or formaldehyde-silicate resins, and mixtures of inorganic and organic coating agents. The latter mixtures may be deposited on red phosphorus simultaneously or in successive steps. In the present connection, the use of red phosphorus which has been treated with organic polymers has proved particularly useful. The compounds which are used are preferably formaldehyde resins, with resorcinol-urea-formaldehyde resins being particularly preferred.

Typical examples of commercial types of red phosphorus are products from Clariant, such as, for example, Red Phosphorus SFD, Exolit RP 602, Exolit RP 605 or Exolit RP 689, Exolit RP 690, Exolit RP 694 and Exolit RP 695, the latter four products being concentrates of red phosphorus in polymeric carrier materials.

The nitrogen compound b2) which is used in addition to red phosphorus may be melamine, melamine cyanurate, -oxalate, -phosphate prim., -phosphate sec. or -pyrophosphate sec., neopentyl glycol boric acid melamine, or melamine phosphate. Guanidine salts and related compounds are also suitable. Melamine cyanurate is particularly preferred within the scope of the present invention. Melamine cyanurate is to be understood to be the reaction product formed from what are preferably equimolar amounts of melamine and cyanuric acid. Suitable melamine cyanurate is commercially available, for example, as Melapur® MC 25 (supplied by DSM Melapur, Heerlen, Holland) or Budit® 315 (supplied by Budenheim, Budenheim, Germany). The melamine cyanurate may also be treated with known inorganic and/or organic media. The average particle size of this material usually ranges between 0.1 and 25 $\mu$m, average particle diameters from 0.1 to 10 $\mu$m being preferred and average particle diameters from 0.1 to 5 $\mu$m being particularly preferred.

A hydrotalcite as defined by component C) is to be understood to be a synthetic or natural mineral of general formula

$$M^{2+}{}_{(1-x)}M^{3+}{}_{x}(OH)_2A^{n-}{}_{x/2}.m\ H_2O$$

wherein
$M^{2+}$ denotes a divalent metal ion, preferably $Mg^{2+}$,
$M^{3+}$ denotes a trivalent metal ion, preferably $Al^{3+}$,
$A^n$ denotes an n-valent anion, preferably $CO_3^{2-}$ or $SO_4^{2-}$,
n denotes an integer greater than 0, preferably 2,
x denotes 0 to 0.5, preferably 0 to 0.33, and
m $\geq$0.

The compound of composition ($Mg_6(CO_3)[Al(OH)_6]_2$ $(OH)_4$ $4H_2O$) is particularly preferred. Hydrotalcites may be obtained commercially under the trade names Hysafe® 539, Nacid®, Sorbplus® PM or Talcid®.

The hydrotalcites which are used may optionally be modified by appropriate chemical treatment.

In addition, the molding composition contains, as component D), 1 to 50 parts by weight, preferably 10 to 40 parts by weight, most preferably 10 to 35 parts by weight, of added fillers and/or reinforcing agents.

Fibrous or particulate fillers and reinforcing agents which may be added include glass fibers, glass beads, glass mats, carbon fibers, aramid fibers, potassium titanate fibers, natural fibers, amorphous hydrated silicas, magnesium carbonate, barium sulphate, mica, silicates, quartz, French chalk, kaolin, titanium dioxide, wollastonite, etc. These substances may also be surface-treated. The preferred reinforcing agents are commercially available glass fibers. These glass fibers, which generally have a fiber diameter between 8 and 18 $\mu$m, may be added as continuous fibers or as cut or chopped glass fibers, wherein the fibers may be coated with a suitable size system and with a bonding agent or bonding agent system, e.g. a silane-based system.

Acicular mineral fillers are also suitable. In the sense of the present invention, acicular mineral fillers are to be understood as mineral fillers with a strongly pronounced acicular character. Acicular wollastonite is an example thereof. The mineral preferably has an L/D (length/diameter) ratio of 8:1 to 35:1, preferably 8:1 to 11:1. The mineral filler may optionally be surface-treated.

The molding compositions according to the invention may also contain further conventional functional additives as component E.

The use in addition of rubber-like elastic polymers (often termed impact-resistance modifiers) may sometimes be advantageous with regard to the range of mechanical properties obtainable.

The latter are most generally copolymers which are preferably synthesised from at least two of the following monomers: ethylene, propylene, butadiene, isobutene, isoprene, chloroprene, vinyl acetate, styrene, acrylonitrile or esters of acrylic or methacrylic acid which contain 1 to 18 C atoms in their alcohol component.

Polymers of this type are described, for example, in Houben-Weyl, Methoden der organischen Chemie, Volume 14/1 (Georg-Thieme-Verlag, Stuttgart, 1961), pages 392 to 406, and in the monograph by C. B. Bucknall, "Toughened Plastics" (Applied Science Publishers, London, 1977).

The rubber-like elastic polymers which are described in WO 00/1054 and WO 00/46419 are preferred.

Examples of other suitable additives include thermal stabilizers, anti-thermal crosslinking agents, UV-stabilizers, plasticizers, flow enhancers and processing aids and anti-drip agents, wherein fluorine-containing compounds such as poly-tetrafluoroethylene (e.g. Teflon®) are particularly preferred, flame-retardant agents, internal lubricants and mold release agents, nucleating agents, anti-static agents and stabilisers, as well as colorants and pigments.

Additives in the form of organic and inorganic compounds of metals may also be included. These include oxides and sulphides of zinc, oxides and hydroxides of magnesium, copper oxide, iron oxide, metal carbonates such as calcium or magnesium carbonate, and borates, particularly zinc borates, as well as generally stoichiometric mixtures of metal compounds.

The invention is explained in more detail below with reference to specific examples.

EXAMPLES

In order to detect the improvement in flame-resistance of polyester molding compositions comprising red phosphorus and melamine cyanurate which is described according to the invention by the addition of hydrotalcite, corresponding plastics molding compositions were produced by compounding the components given in Table 1. For this purpose, the individual components were mixed in a double-shaft extruder (ZSK 45 supplied by Haake, 20 cm worm length) at temperatures between 260 and 300° C., were discharged as a strand, cooled until they could be granulated, and granulated. Drying (generally for two days at 70° C. in a vacuum drying oven) was followed by processing the granular material at temperatures between 260 and 300° C. to form standard test specimens for UL94V testing, and also to form test specimens for the glowing wire test according to IEC DIN 695-2-1, by means of which the burning properties of the molding compositions according to the invention were determined.

Components Used:
A: Pocan® 1300 (Bayer AG, Leverkusen, Germany)
B 1: Red phosphorus (supplied by Aldrich, St. Louis, Mo., USA), which was coated with a resorcinol-urea-formaldehyde-hexamethylenetetramine resin
B2: Melapur® MC 25 (DSM Melapur, Heerlen, Holland)
C: hydrotalcite (Hysafe® 539, 3.;. Huber Corp., Havre de Grace, USA)
D: CS 7962 glass fibers (Bayer AG, Leverkusen, Germany)

The flame-resistance of plastics is determined by Method UL94V (in this respect, see a) Underwriters Laboratories Inc. Standard of Safety, "Test for Flammability of Plastic Materials for Parts in Devices and Appliances", page 14 et seq., Northbrook 1998; b) J. Troitzsch, "International Plastics Flammability Handbook", page 346 et seq., Hanser Verlag, Munich 1990), which is extensively used in the electrical/-electronics field. Using this method, the after-burn times and drip-off behavior of ASTM standard test specimens are determined.

For a flame-proofed plastics material to be classified in fire classification UL94V-0, the following criteria must be fulfilled: for a set of 5 ASTM standard test specimens (dimensions: 127×12.7×X, where X=3.2; 1.6 and 0.8 mm) all the specimens must exhibit an after-burn which is no longer than 10 seconds after two applications of 10 seconds duration of an open flame of defined height. The sum of the after-burn times for 10 ignitions of 5 specimens must not be greater than 50 seconds. Moreover, the test specimen concerned must not exhibit burning drip-off behavior, complete combustion or after-glow for longer than 30 seconds. Classification UL94V-1 requires that the individual after-burn times are no longer than 30 seconds and that the sum of the after-burn times after 10 ignitions of 5 specimens is no greater than 250 seconds. The total after-glow time must not be longer than 250 seconds. The remaining criteria are identical to those mentioned above. A material is given a fire classification of UL94V-2 if it exhibits burning drip-off behavior but fulfils all the other criteria of classification UL94V-1.

Another test of the flame-resistance of plastics is the glowing wire test according to DIN IEC 695-2-1. In this test, 10 test specimens, for example panels of geometry 60×60×2 mm or 1 mm) are tested, using a glowing wire at temperatures between 550 and 960° C., for the maximum temperature at which an after-burn time of 30 seconds is not exceeded and the specimen does not exhibit burning drip-off behavior. This test is also of particular interest in the electrical/electronics field, since, in the event of fire or in cases of overload, components in electronic products can reach temperatures such that parts in their immediate vicinity can ignite. Conditions of thermal loading such as these are reproduced in the glowing wire test.

Table 1 shows the results of the compounding experiments performed (data given in parts by weight):

| Example | A | B1 | B2 | C | D | UL94V(0.8 mm) | GWI(2 mm) |
|---|---|---|---|---|---|---|---|
| 1 (comp.) | 52 | 8 | 10 | — | 30 | not withstood | 960° C. |
| 2 | 51.9 | 8 | 10 | 0.1 | 30 | V-1 | 960° C. |
| 3 | 51.6 | 8 | 10 | 0.4 | 30 | V-1 | 960° C. |
| 4 (comp.) | 51.3 | 8 | 10 | 0.7 | 30 | V-2 | 960° C. |

The results given in the able clearly show the sudden increase in flame-resistance of UL test specimens of thickness 0.8 mm due to the addition of amounts of hydrotalcite according to the invention. Without the addition of this mineral, the UL94 V test is not withstood at this test specimen thickness. Even the admixture of 0.1% hydrotalcite immediately results in a UL94 V-1 classification, which is also achieved on the addition of 0.4% hydrotalcite. However, burning behavior which still only corresponds to UL94 V-2 is observed on the addition of 0.7% hydrotalcite.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:
1. A molding composition comprising
   A) one or more polymers selected from the group consisting of polyester, polyester carbonate and polycarbonate,
   B) 5 to 30 parts by weight of a flame retardant containing
      b1) 16 to 50% by weight with respect to B) of red phosphorus, and
      b2) 50 to 84% by weight with respect to B) of at least one nitrogen compound selected from the group consisting of melamine, melamine cyanurate, melamine oxalate, melamine phosphate prim., melamine phosphate sec. melamine pyro-phosphate sec., neopentyl glycol boric acid melamine, polymeric melamine phosphate and guanidine salts,
   C) 0.001 to 0.69 parts by weight of a hydrotalcite, as well as

D) 1 to 50 parts by weight of fillers and/or reinforcing agents, and

E) 0 to 50 parts by weight of at least one functional additive selected from the group consisting of thermal stabilizers, anti-thermal crosslinking agents, UV stabilizers, plasticizers, flow enhancers, processing aids, impact modifiers, flame-retardant agents, anti-drip agents, internal lubricants, mold release agents, nucleating agents, anti-static agents, colorants and pigments, wherein the sum of the proportions of A to E is 100 parts by weight.

2. The molding composition according to claim 1, wherein component A is at least one polyalkylene terephthalate.

3. The molding composition according to claim 1, wherein component A is at least one member selected from the group consisting of polyethylene terephthalate and polybutylene terephthalate.

4. The molding composition according to claim 2 further comprising polycarbonate.

5. The molding composition according to claim 1, wherein b1) is microencapsulated phosphorus.

6. The molding composition according to claim 1, wherein b2) is melamine cyanurate.

7. The molding composition according to claim 1, wherein C) is present in an amount of 0.05 to 0.5 parts by weight.

8. The molding composition according to claim 1, wherein C) has the general formula

$$M^{2+}_{(1-x)}M^{3+}_x(OH)_2A^{n-}_{x/2} \cdot mH_2O$$

wherein $M^{2+}$ denotes a divalent metal ion, $M^{3+}$ denotes a trivalent metal ion, $A^n$ denotes an n-valent anion, n denotes an integer greater than 0, x denotes 0 to 0.5, and m $\geq$ 0.

9. The molding composition according to claim 1, wherein C) has the composition $Mg_6(CO_3)[Al(OH)_6]_2(OH)_4 \cdot 4H_2O$.

10. The molding composition according to claim 1 wherein functional additive is selected from the group consisting of thermal stabilizers, anti-thermal crosslinking agents, UV stabilizers, plasticizers, flow enhancers, processing aids, impact modifiers, flame-retardant agents, anti-drip agents, internal lubricants, mold release agents, nucleating agents, anti-static agents, colorants and pigments.

11. The molding composition according to claim 1 further containing at least one member selected from the group consisting of zinc oxide, zinc borate, zinc sulfide or mixtures thereof.

12. A method of using the molding compositions according to claim 1 comprising producing a molded article.

13. The method of claim 12 wherein article is a sheet.

14. The method of claim 12 wherein article is an extruded fiber.

15. The molded article obtained by the method of claim 12.

* * * * *